United States Patent
Huang

(10) Patent No.: US 7,182,286 B2
(45) Date of Patent: Feb. 27, 2007

(54) CABLE WINDER APPARATUS

(76) Inventor: Chin Huang, 5F, No. 190, Sec. 2, Chung-Hsin Rd., Hsin-Tien City, Taipei Hsien (TW)

( * ) Notice: Subject to any disclaimer, the term of this patent is extended or adjusted under 35 U.S.C. 154(b) by 281 days.

(21) Appl. No.: 11/022,669

(22) Filed: Dec. 28, 2004

(65) Prior Publication Data
US 2006/0138268 A1   Jun. 29, 2006

(51) Int. Cl.
*B65H 75/48* (2006.01)

(52) U.S. Cl. .............................. 242/378.1; 242/378.2; 242/378.3

(58) Field of Classification Search ................. 242/378, 242/378.1–378.3, 396.2, 396.4, 388.1, 381.5, 242/385, 385.1–4; 191/12.2 R, 12.4
See application file for complete search history.

(56) References Cited

U.S. PATENT DOCUMENTS

| | | | | |
|---|---|---|---|---|
| 6,439,490 B1 * | 8/2002 | Hwang | ..................... | 242/378.1 |
| 6,808,138 B2 * | 10/2004 | Liao | ........................ | 242/378.1 |
| 6,866,219 B2 * | 3/2005 | Wei | .......................... | 242/378.4 |
| 7,028,939 B2 * | 4/2006 | Liao | ........................... | 242/378 |

* cited by examiner

*Primary Examiner*—Emmanuel Marcelo
*Assistant Examiner*—Sang Kim

(57) ABSTRACT

A cable winder apparatus includes a casing, a winding tray, a spiral spring, a cable set, and a clamping unit. The casing has an accommodating space defined therein, a shaft in the accommodating space and two cutouts on two ends of the casing. The winding tray is pivotally connected to the shaft and has an inner wheel on one end thereof. The spiral spring is arranged in the winding tray and has one end connected to the winding tray and another end connected to the shaft. The cable set is wrapped around outer peripheral of the winding tray and composed of two stacked cables. The clamping unit is arranged in the accommodating space and has an outer wheel rotatably engaged with the inner wheel of the winding tray. The cables of the cable set can be easily pulled out and received by the cable winder apparatus.

14 Claims, 6 Drawing Sheets

CABLE WINDER APPARATUS

BACKGROUND OF THE INVENTION

1. Field of the Invention

The present invention relates to a cable winder apparatus, and more particularly to a cable winder apparatus for automatically winding function and the cable therein can be easily pulled out and wound back.

2. Description of Prior Art

Conventional electronic devices such as notebook computer, telephone, digital still camera or card reader are intensively employed in ordinary life or work. The electronic devices are communicated to other device by electrical cable. The electrical cable should be sufficiently long for providing practical electrical connection. A long electrical cable has the problem of twist and knot. Therefore, a cable winder is developed to receive an unused section of cable However, it still remains much room for improvement.

Conventional cable winder generally comprises a casing, a winding tray, a spiral spring and a cable set. The spiral spring is retained on the winding tray and used to wind and restore the cable wrapped around the winding tray. The cable has two ends; each end is connected to a plug of different type. Therefore, the cable can be adapted between different sockets. The casing has various designs such as a plurality of conductive rings on one side of the winding tray and a plurality of conductive tongues or steel balls on another side of the winding tray. Therefore, the cable winder provides conduction during winding operation However, the conventional cable winder has complicated structure such the assembling time increases and friction is easily induced among elements thereof.

Moreover, the cable is arranged in a closed casing, the cable is liable to rotate during winding operation. The winding operation is difficult when the cable is jammed in the casing. The cable winder need to disassembling when fixing this problem. Moreover, the conventional cable winder does not have clamping structure and the exposed cable has strain thereon due to the elastic force of the spiral spring. It is difficult to keep exposed cable with fixed length.

SUMMARY OF THE INVENTION

The present invention is to provide a cable winder apparatus with inter-engaged wheel sets between the winding tray and clamping unit. The cable can be easily pulled out and wound back with simple cable winder structure Accordingly, the present invention provides a cable winder apparatus comprising a casing having an accommodating space defined therein, shaft in the accommodating space and two cutouts on two ends of the casing; a winding tray placed in the accommodating space and pivotally connected to the shaft, the winding tray having an inner wheel on one end thereof; a spiral spring arranged in the winding tray and having one end connected to the winding tray and another end connected to the shaft of the casing; a cable set wrapped around outer peripheral of the winding tray and composed of a first cable and a second cable stacked with the first cable, each cable having one end extending out from one cutout; and a clamping unit arranged in the accommodating space and engaged with the casing, the clamping unit having an outer wheel rotatably engaged with the inner wheel of the winding tray.

The above summaries are intended to illustrate exemplary embodiments of the invention, which will be best understood in conjunction with the detailed description to follow, and are not intended to limit the scope of the appended claims.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
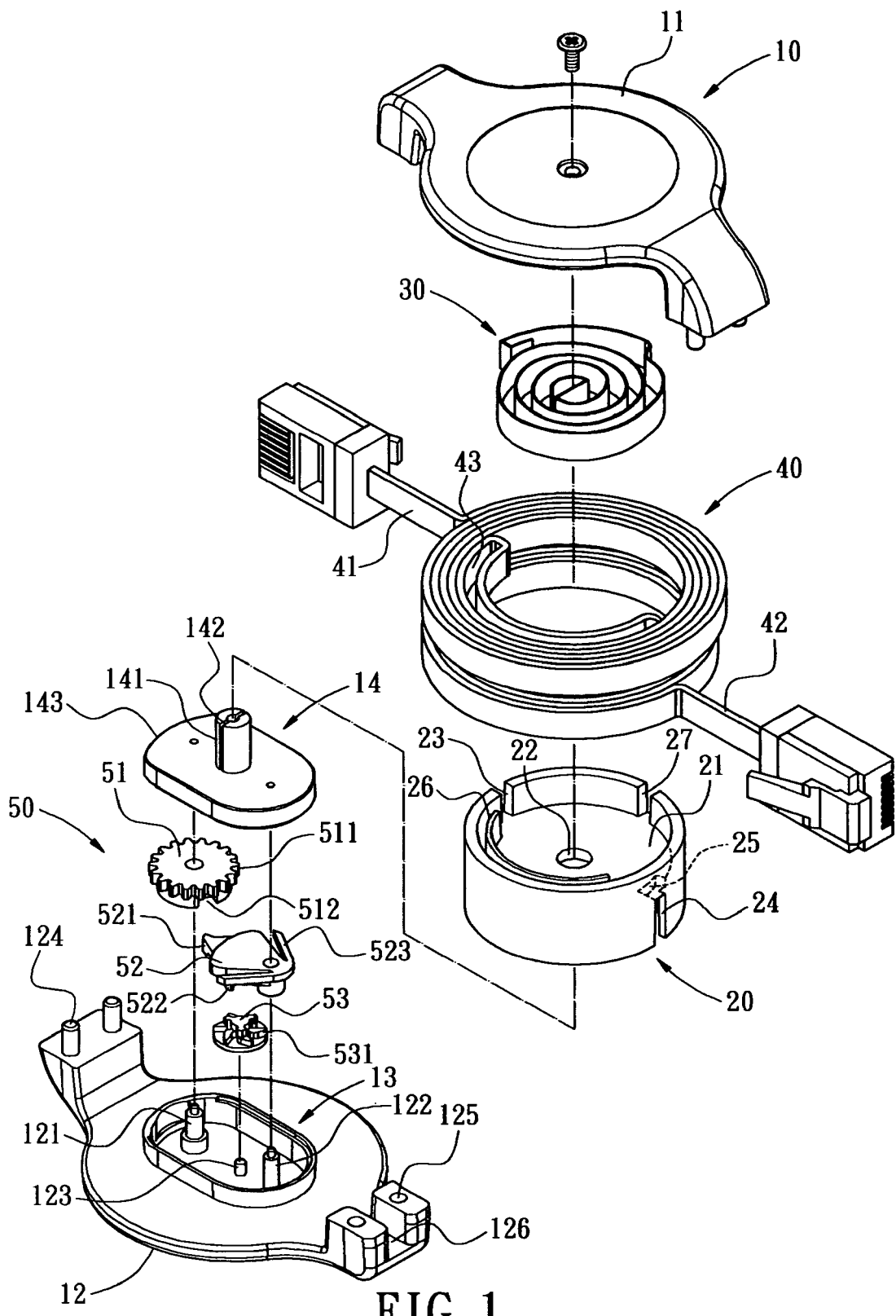
FIG. 1 shows an exploded view of the present invention.
Figure 2:
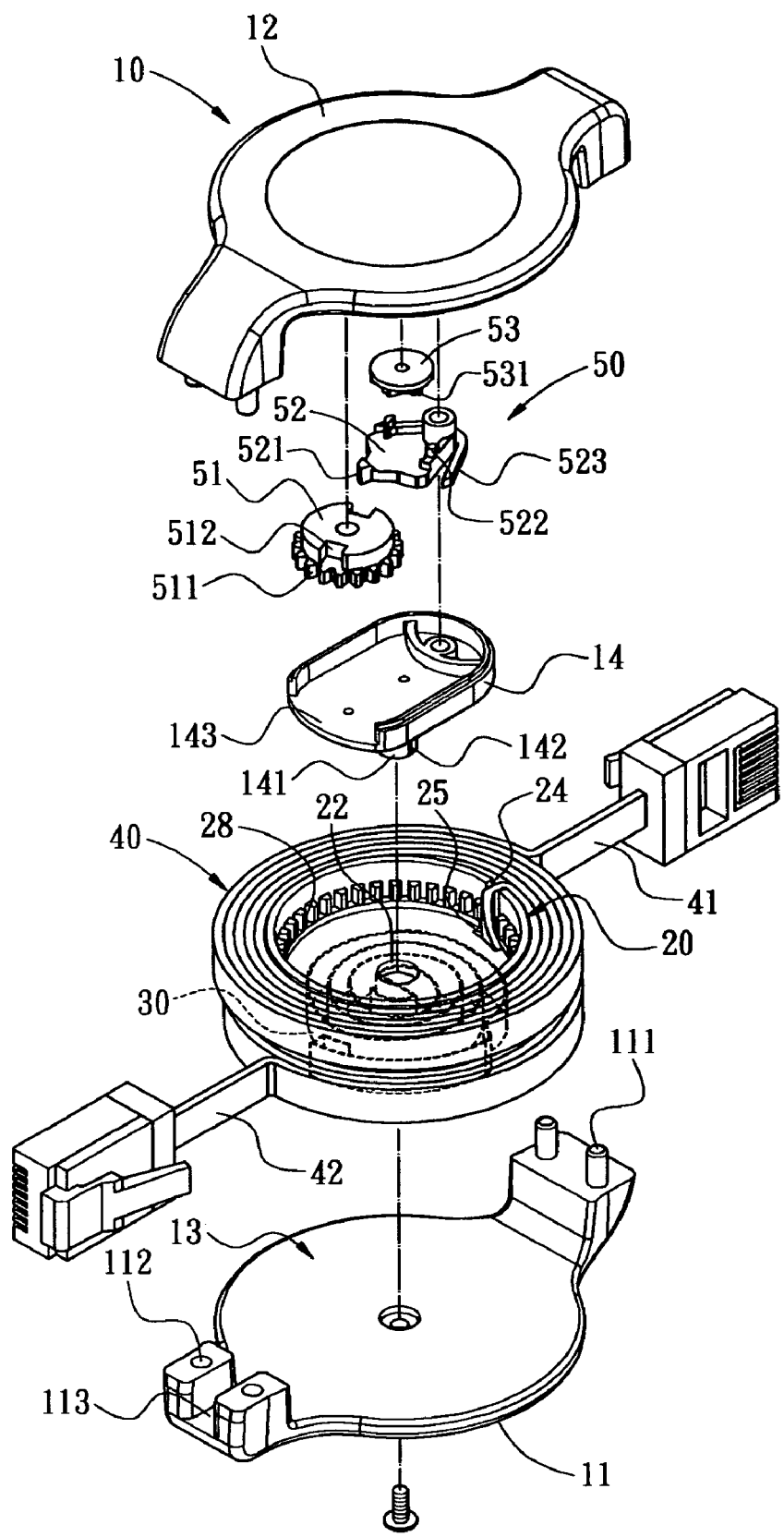
FIG. 2 shows another exploded view of the present invention.
Figure 3:
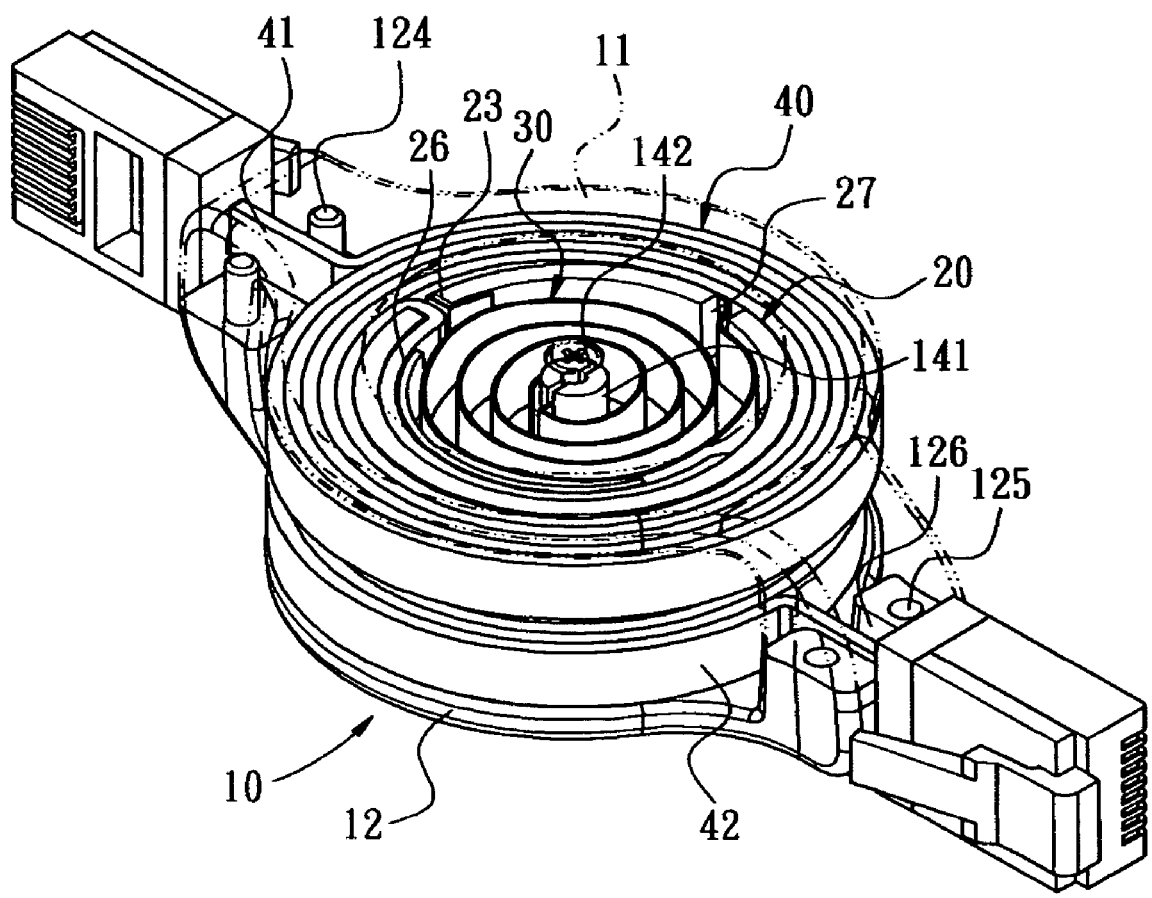
FIG. 3 shows a perspective view of the present invention.

With reference to FIGS. 1 to 3, the present invention provides a cable winder apparatus comprising a casing 10, a winding tray 20, a spiral spring 30, a cable set 40 and a clamping unit 50.

The casing 10 comprises an upper shell 11 and a lower shell 12 for defining an accommodation space 13 therein. The lower shell 12 has a first post 121, a second post 122 and a third post 123 extended therefrom. A base 14 is connected to those posts 121–123 and has a shaft 141 extended at center thereof. A slit 142 is defined on the shaft 141.

An opening 143 is defined on one side of the base 14. The upper shell 11 has two first pins 111 on one side thereof and two first holes 112 defined on another sides thereof. The lower shell 12 has two second pins 124 on one side thereof and two second holes 125 defined on another sides thereof. The second pins 124 and the second holes 125 are corresponding to the first holes 112 and the first pins 111, respectively. A first cutout 113 is defined between the first holes 112, and a second cutout 126 is defined between the second holes 125

The winding tray 20 is arranged in the accommodation space 13 and has a baffle 21 with a through hole 22 at center thereof. The shaft 141 passes through the through hole 22. The winding tray 20 further has an upper dent 23 and a lower dent 24 on upper edge and lower edge thereof. The baffle 21 has a through groove 25 defined on one side thereof and an annulus groove 26 near the through groove 25. The annulus groove 26 is arranged between the upper dent 23 and the lower dent 24. A mouth 27 is defined opposite to the annulus groove 26. Moreover, an inner wheel 28 is provided below the baffle 21.

The spiral spring 30 is arranged in the winding tray 20 and is made of metal plate or metal wire. The spiral spring 30 has one U-shaped end for locking to the upper dent 23 of the winding tray 20. The spiral spring 30 has a portion attached to outer peripheral of the winding tray 20 and then the spiral spring 30 enters the mouth 27 and then wraps atop the baffle 21. The spiral spring 30 further has one semi-circular end embedding into the slit 142.

The cable set 40 is wrapped on outer peripheral of the winding tray 20 and composed of a first cable 41 stacked with a second cable 42. One end of the first cable 41 and one end of the second cable 42 extends out of the first cutout 113 and the second cutout 126, respectively. Moreover, the ends extended from those cutouts can be connected to one of USB plug, IEEE 1394 plug, DC power plug, telephone line plug, network line plug, earphone plug, hanging decoration or other connector. The first cable 41 has an arc-shaped gap 43 therein and enabling the innermost cable firmly embedding into the annulus groove 26 of the winding tray 20. Moreover, a connection end of the first cable 41 and the second cable 42 passes through the through groove 25 of the winding tray 20.

The clamping unit 50 is placed in the accommodation space 13 and pivotally connected with the first post 121, the second post 122 and the third post 123. The clamping unit 50 comprises an outer wheel 51, a pendulum 52 and a ratchet wheel 53. The outer wheel 51 is pivotally connected to the first post 121 and has tooth 511 extruding out of the opening 143 of the base 14 in order to be engaged with the inner wheel 28 of the winding tray 20. The tooth 511 has locking grooves 512 opposite to each other with 180° separation. The pendulum 52 is pivotally connected to the second post 122 and has a bump 521 and two blocks 522. Each of the blocks 422 has a spring plate 523 to limit the pendulum 52 to swing within a predetermined range. The bump 521 is placed in one locking groove 512. The ratchet wheel 53 is pivotally connected to the third post 123 and placed below the pendulum 52. The ratchet wheel 53 has a plurality of ratchets 531 for locking with the block 522 to provide stopping mechanism during operation stroke.

Figure 4:
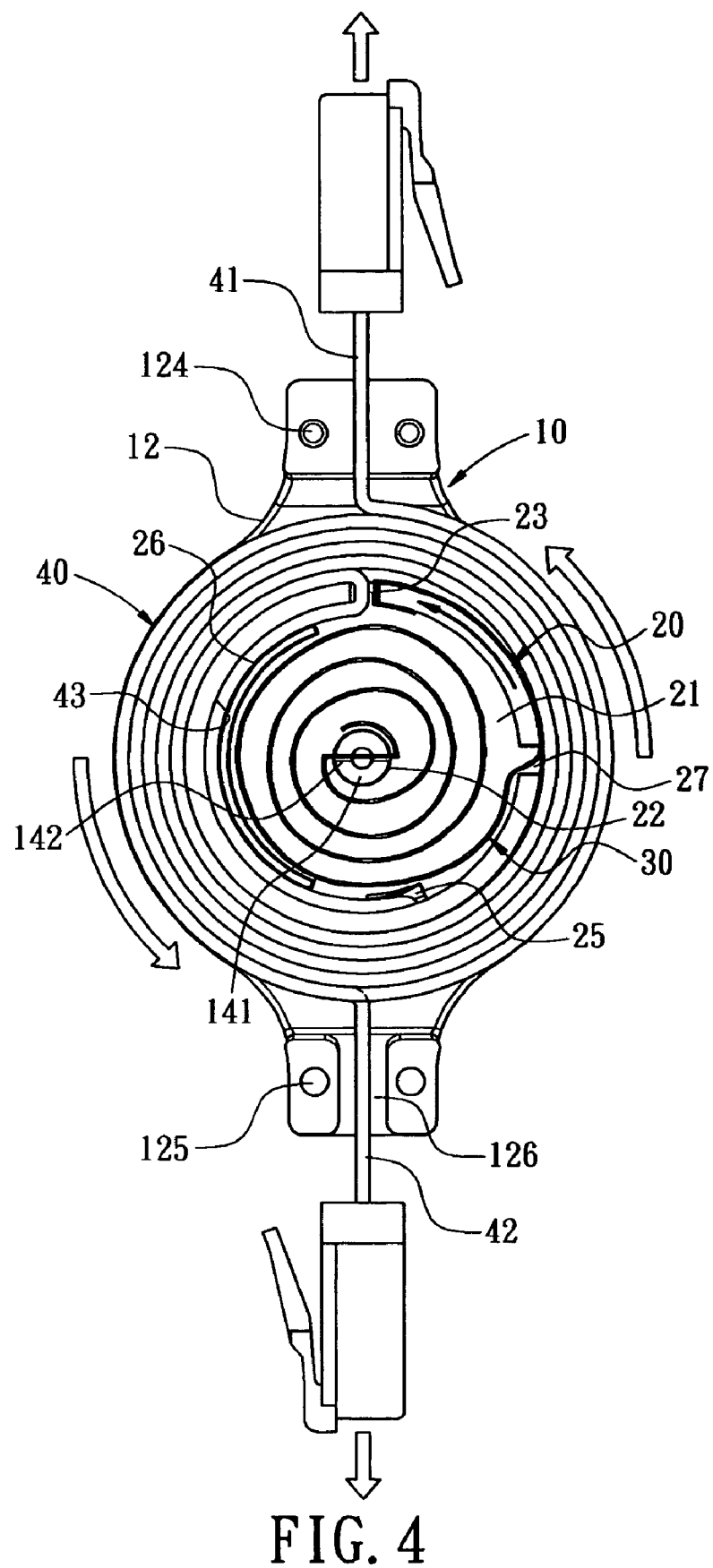
FIG. 4 is a sectional view showing the operation of the present invention.
Figure 5:
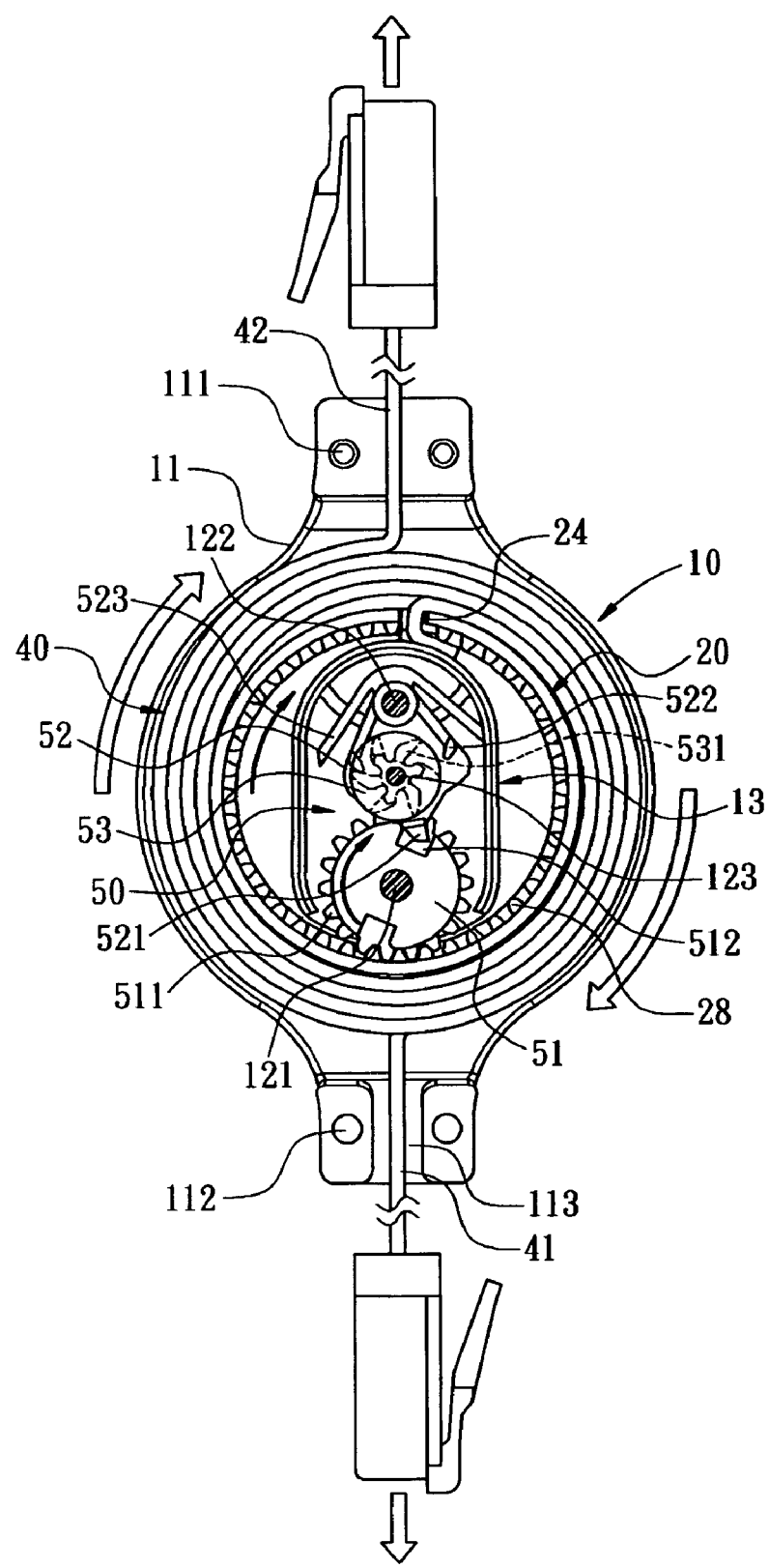
FIG. 5 is another sectional view showing the operation of the present invention.
Figure 6:
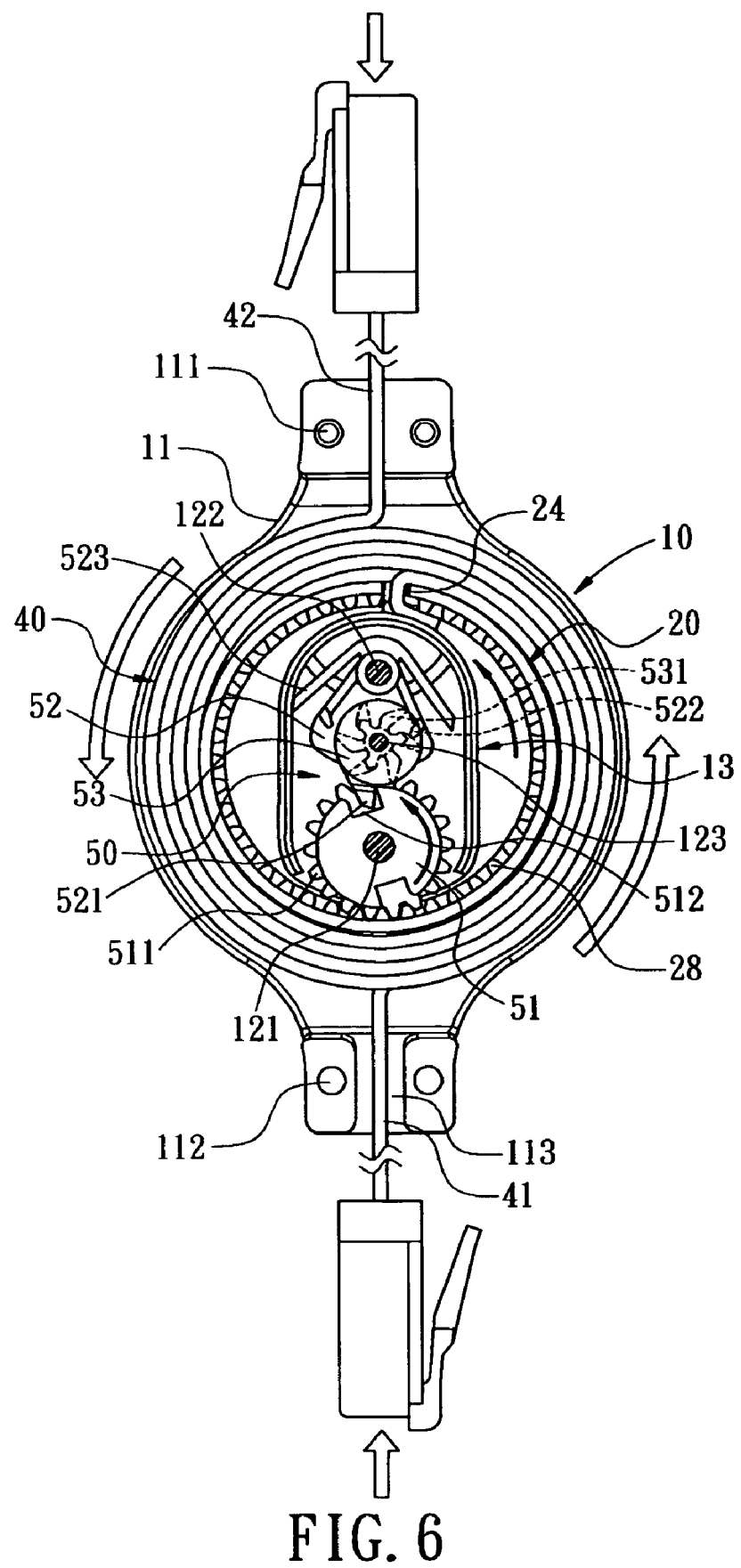
FIG. 6 is still another sectional view showing the operation of the present invention.

FIGS. 4, 5, and 6 are sectional views showing the operation of the cable winder apparatus according to the present invention. When the first cable 41 and the second cable 42 are pulled outward through the first cutout 113 and the second cutout 126 of the casing 10, the winding tray 20 will rotate in clockwise direction as shown in FIG. 5. The spiral spring 30 is wound inwardly, and the tooth 511 of the outer wheel 51 is rotated accordingly. The bump 521 is driven by the locking groove 512 such that the pendulum 52 is rotated along single direction and the cable set 40 can be pulled out. If the first cable 41 and the second cable 42 stop pulling out, the winding tray 20 will be wound back by the restoring force of the spiral spring 30. The bump 521 is blocked by the locking groove 512 to provide a braking mechanism. Moreover, to wind back the first cable 41 and the second cable 42, the user can slightly pull out the first cable 41 and the second cable 42. The tooth 511 of the outer wheel 51 is driven by the inner wheel 28 to rotate. Therefore, the bump 521 is released from the locking groove 512. A rotational inertial force is produced when the edge of the outer wheel 51 is abutted to the bump 521. The locking groove 512 will not block the bump 521 such that the cable winder apparatus can be quickly wound back.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A cable winder apparatus comprising
a casing having an accommodating space defined therein, a shaft in the accommodating space and two cutouts on two ends of the casing;
a winding tray placed in the accommodating space and pivotally connected to the shaft, the winding tray having an inner wheel on one end thereof;
a spiral spring arranged in the winding tray and having one end connected to the winding tray and another end connected to the shaft of the casing;
a cable set wrapped around outer peripheral of the winding tray and composed of a first cable and a second cable stacked with the first cable, each cable having one end extending out from one cutout; and
a clamping unit arranged in the accommodating space and engaged with the casing, the clamping unit having an outer wheel rotatably engaged with the inner wheel of the winding tray.

2. The cable winder apparatus as in claim 1, wherein the casing comprises an upper shell and a lower shell.

3. The cable winder apparatus as in claim 2, wherein the upper shell has two first pins and two first holes, the lower shell has two second holes and two second pins for engaged with the first pins and the first holes, respectively, wherein one cutout is placed between the two first holes and another cutout is placed between the two second holes.

4. The cable winder apparatus as in claim 2, wherein the lower shell has a base therein and said shaft extended from center of the base.

5. The cable winder apparatus as in claim 4, wherein the shaft has a slit defined thereon and one end of the spiral spring is embedded into the slit.

6. The cable winder apparatus as in claim 4, wherein an opening is defined on one side of the base and the outer wheel of the clamping unit extrudes from the opening in order for rotatably engaging with the inner wheel.

7. The cable winder apparatus as in claim 1, wherein the winding tray has a baffle with a through hole at center thereof, the shaft of the casing passing through and pivotally connected to the through hole.

8. The cable winder apparatus as in claim 7, wherein the winding tray comprises an upper dent and a lower dent on upper edge and lower edge thereof, the baffle has a through groove on one side thereof, a connection end of the first cable and the second cable passes through the dents and through groove of the winding tray.

9. The cable winder apparatus as in claim 1, wherein the spiral spring is made of metal plate or metal wire.

10. The cable winder apparatus as in claim 1, wherein one end of the first cable is connected to one of USB plug, IEEE 1394 plug, DC power plug, telephone line plug, network line plug, earphone plug, and hanging decoration.

11. The cable winder apparatus as in claim 1, wherein one end of the second cable is connected to one of USB plug, IEEE 1394 plug, DC power plug, telephone line plug, network line plug, earphone plug, and hanging decoration.

12. The cable winder apparatus as in claim 1, wherein the clamping unit further comprises a pendulum and a ratchet wheel, the lower shell has a first post, a second post and a third post extended therein, wherein the outer wheel, the pendulum and the ratchet wheel of the clamping unit are pivotally connected to the first post, the second post and the third post, respectively.

13. The cable winder apparatus as in claim 12, wherein the pendulum comprises a bump and two blocks, the outer wheel comprises a locking groove for receiving the bump, the ratchet wheel has a plurality of ratchets locking with the blocks.

14. The cable winder apparatus as in claim 13, wherein teach of the blocks has a spring plate on outer side thereof for limiting the pendulum to move within predetermined range.

* * * * *